(12) United States Patent
Zhou et al.

(10) Patent No.: US 12,237,867 B2
(45) Date of Patent: Feb. 25, 2025

(54) HIGH-SPEED TIA ANTI-5G WIFI ELECTROMAGNETIC INTERFERENCE METHOD

(71) Applicant: XIAMEN EOCHIP SEMICONDUCTOR CO., LTD, Xiamen (CN)

(72) Inventors: Yuanyuan Zhou, Xiamen (CN); Jinghu Li, Xiamen (CN); Fujie Chen, Xiamen (CN); Liangqiong Shi, Xiamen (CN)

( * ) Notice: Subject to any disclaimer, the term of this patent is extended or adjusted under 35 U.S.C. 154(b) by 0 days.

(21) Appl. No.: 18/787,048

(22) Filed: Jul. 29, 2024

(65) Prior Publication Data

US 2025/0038850 A1   Jan. 30, 2025

(30) Foreign Application Priority Data

Jul. 28, 2023   (CN) .......................... 2023109411041

(51) Int. Cl.
| | |
|---|---|
| *H04B 10/2507* | (2013.01) |
| *H04B 10/69* | (2013.01) |
| *H04B 10/80* | (2013.01) |

(52) U.S. Cl.
CPC ....... *H04B 10/2507* (2013.01); *H04B 10/697* (2013.01); *H04B 10/801* (2013.01)

(58) Field of Classification Search
None
See application file for complete search history.

(56) References Cited

U.S. PATENT DOCUMENTS

| | | | |
|---|---|---|---|
| 5,652,425 A | 7/1997 | Sawada et al. | |
| 6,774,448 B1 * | 8/2004 | Lindemann | H01L 27/1463 |
| | | | 257/466 |
| 9,203,356 B2 * | 12/2015 | Weber | H03F 3/087 |
| 11,335,768 B2 * | 5/2022 | Ainsworth | H01L 23/647 |
| 11,967,610 B2 * | 4/2024 | Ainsworth | H01L 23/585 |
| 12,113,575 B2 * | 10/2024 | Li | H04B 10/564 |
| 2003/0193095 A1 | 10/2003 | Sasaki et al. | |
| 2003/0197549 A1 | 10/2003 | Rasmussen et al. | |

(Continued)

FOREIGN PATENT DOCUMENTS

| | | | |
|---|---|---|---|
| CN | 205609516 U | * | 9/2016 |
| WO | 1985000682 A1 | | 2/1985 |
| WO | 2022224308 A1 | | 10/2022 |

*Primary Examiner* — Jai M Lee
(74) *Attorney, Agent, or Firm* — Novoclaims Patent Services LLC; Mei Lin Wong

(57) ABSTRACT

A high-speed TIA anti-5G WIFI electromagnetic interference method includes the steps of: stacking a high-voltage capacitor C9 and a resistor R11 for constructing a filter circuit on a bare DIE chip of TIA; splitting C9 into two parallel filter capacitors C91 and C92, which satisfy C9=C91+C92, C91=C92; constructing differential output to cancel signal interference; constructing electromagnetic interference that cancels out lens leakage by stacking avalanche photodiode APD, C91 and gold-plated pad on the vertical axis close to the bare DIE chip, and connecting to the pads through gold wires; stacking R11 and C92 on the vertical axis between pins VDD and VAPD, connecting R11 to C91 through gold wire No. 1, connecting C92 to pin VAPD through gold wire No. 2, the gold wire No. 1 and the gold wire No. 2 form a 90° angle to offset the electromagnetic interference leaked by the lens.

8 Claims, 7 Drawing Sheets

(56) References Cited

U.S. PATENT DOCUMENTS

| | | | |
|---|---|---|---|
| 2006/0133739 A1* | 6/2006 | Kim | G02B 6/4242 |
| | | | 385/88 |
| 2008/0122034 A1* | 5/2008 | Liu | H01L 28/20 |
| | | | 257/E31.112 |
| 2009/0189059 A1 | 7/2009 | Smith | |
| 2017/0063452 A1* | 3/2017 | Shirai | H04B 10/07955 |
| 2018/0316441 A1* | 11/2018 | Yagisawa | H04B 10/40 |
| 2022/0115313 A1 | 4/2022 | Deban et al. | |

\* cited by examiner

HIGH-SPEED TIA ANTI-5G WIFI ELECTROMAGNETIC INTERFERENCE METHOD

CROSS REFERENCE OF RELATED APPLICATION

This is a non-provisional application that claims priority to Chinese application number 2023109411041, filing date Jul. 28, 2023, the entire contents of each of which are expressly incorporated herein by reference.

BACKGROUND OF THE PRESENT INVENTION

Field of Invention

The present invention relates to the field of integrated circuits and optical communications.

Description of Related Arts

At the receiving end (ROSA) of the optical fiber communication module, the optical signal is converted into a current signal through an avalanche photodiode (APD), and then the current signal is converted into a voltage signal through a transimpedance amplifier (TIA). When the avalanche photodiode (APD) is working normally, a reverse bias high voltage of about 45V is required at both ends to form an avalanche state for the electrons inside it, which amplifies the weak photocurrent, i.e. the multiplication effect of the APD. Therefore, the APD has a high sensitivity and a relatively small dark current, and can receive optical signals sent from a long distance.

5G WiFi refers to WiFi that runs in the 5 GHz radio wave band and uses the 802.11ac protocol, with a transmission speed of more than 1 Gpbs. The WiFi router converts the 5 GHz high-frequency carrier and low-frequency modulated data signal into a 5 GHz high-frequency modulated signal, and transmits it to the antenna with sufficient large power, and then radiates it into space in the form of electromagnetic waves. The antenna inside the mobile device receives the electromagnetic wave signal in the space and converts it into electrical signal data to complete the communication of data.

FIG. 1 shows a schematic diagram of electromagnetic interference on a TO package (Transistor Outline, coaxial package). In FIG. 1, the TO package is a packaging method that places the transimpedance amplifier TIA, avalanche photodiode APD, and discrete components (capacitors, resistors) on a storage platform inside the metal tube housing 100, and uses metal to connect the soldering pad PAD of the transimpedance amplifier TIA to other components and pins. The metal tube housing 100 is connected to the ground to shield the electromagnetic interference signal. The top of the metal tube housing 100 is a lens opening 200 for embedding a focusing lens. The light transmitted by the optical fiber is focused on the light receiving area of the APD through the focusing lens. The APD generates a photocurrent which then passes through the transimpedance amplifier TIA for signal amplification. The 5G WiFi electromagnetic interference signal 300 radiated into space enters an internal area of the metal tube housing 100 from the focusing lens and the pins of the metal tube housing (metal antenna). The pins of the metal tube housing include the ground pin GND, the reverse bias high voltage pin VAPD, the power pin VDD, and the positive and negative pins OUTP and OUTN of the TIA output. Since the signal that the transimpedance amplifier (TIA) amplifies is extremely weak signals, the 5G WiFi electromagnetic interference signal will greatly reduce the receiving sensitivity of the transimpedance amplifier and shorten the maximum distance ROSA can recognize signals.

FIG. 2 is a traditional anti-WiFi interference ROSA_PCB circuit diagram. Resistor R11 and high-voltage capacitor C9 are placed at the cathode of the APD to form a low-pass filter to filter out the ripple of the current mirror chip output pin MIROUT, and also eliminate the electromagnetic interference on the metal pin VAPD of the tube housing.

FIG. 3 is a TO bonding scheme of TIA corresponding to FIG. 2. This traditional bonding scheme has a weak ability to resist WiFi interference. The storage platform inside the metal tube housing 100 uses discrete devices. The high-voltage capacitor C9 (470 pF) and the resistor R11 (200Ω) are combined to form a filter circuit, which can filter out the electromagnetic interference on the metal pin VAPD of the tube housing. However, the more casual wiring method has become an antenna invisibly. The antenna will receive electromagnetic interference leaked from the lens opening, damaging the normal signal that needs to be amplified and the signal that has been amplified.

In actual applications, the bandwidth of high-speed TIA can usually reach more than 10 GHz, while the carrier frequency of WiFi is 5 GHz. Therefore the carrier frequency is within the bandwidth of high-speed TIA, which will seriously affect the ability of high-speed TIA to receive optical signals and reduce the receiving sensitivity. As the bandwidth of high-speed TIA increases, the impact becomes more serious.

The traditional anti-interference solution is to use a combination of discrete high-voltage capacitors and resistors to form a filter circuit to filter out electromagnetic interference on the pins. Although this solution can effectively suppress invalid signals, the discrete devices used have a relatively large size and high cost. Some design companies also use additional integrated high-voltage capacitors and resistors stacked on top of the bare DIE (bare chip) of TIA to resist WiFi interference. Since the manufacturing process used by high-speed TIA is generally GeSi or advanced process with feature size less than 90 nm, the manufacturing cost by itself is extremely high. In addition, the chip area of TIA is generally small, which is about 1 mm$^2$, it is only possible to manufacture small high-voltage capacitors on this chip area. ROSA also requires additional small discrete capacitors to meet the requirements, so the overall manufacturing cost has not dropped much. Also, it brings another disadvantage: the stacking solution increases the vertical height of the APD, which is not conducive to the focusing of the lens and the APD light receiving area, and reduces the sensitivity of the TIA receiving signal.

The above two existing anti-interference solutions only consider the interference generated by metal pins, but do not consider the electromagnetic interference transmitted from the lens opening to the inside of the tube housing. This will cause the traditional anti-interference solution to be unable to meet the performance requirements of high-speed TIA.

SUMMARY OF THE PRESENT INVENTION

An object of the present invention is to solve the existing problems in existing high-speed TIA anti-5G WIFI electromagnetic interference, and provide a high-speed TIA anti-5G WIFI electromagnetic interference method.

According to the present invention, the high-speed TIA anti-5G WIFI electromagnetic interference method provides two solutions:

The first solution: the high-speed TIA anti-5G WIFI electromagnetic interference method of the present invention comprises the steps of:

providing a bare DIE chip 1 of TIA and an avalanche photodiode APD 2 on a storage platform of a metal tube housing 100, wherein the metal tube housing 100 has a pin GND, a pin VAPD, a pin VDD, a pin OUTP and a pin OUTN;

the method is to stack a high-voltage capacitor C9 and a resistor R11 for constructing a filter circuit on the bare DIE chip of the TIA, wherein the filter circuit is used to process ripple filtering of an output pin MIROUT of a current mirror chip CURRENT_MIRROR inside a receiving end ROSA of an optical fiber communication module, and specifically includes the following steps:

A1: split the high-voltage capacitor C9 into two parallel filter capacitors C91 and C92, and satisfy C9=C91+C92, C91=C92;

A2: construct differential outputs to cancel signal interference by the following steps:
setting the bare DIE chip 1 of the TIA on a longitudinal axis of the storage platform between the pins OUTP and OUTN;
connecting the pin OUTP to the output pad OUTP on the bare DIE chip 1 of the TIA through a No. 3 gold wire 7 perpendicular to the longitudinal axis;
connecting the pin OUTN to the output pad OUTN on the bare DIE chip 1 of the TIA through a No. 4 gold wire 8 perpendicular to the longitudinal axis;
the No. 3 gold wire 7 and the No. 4 gold wire 8 are of equal length and are kept on the same horizontal level, so as to achieve mutual cancellation of signal interference of differential outputs of the high-speed TIA.

A3: cancel out an electromagnetic interference from lens leakage by the following steps:
the avalanche photodiode APD 2, the filter capacitor C91 and a gold-plated pad 4 are stacked in sequence on a vertical axis of the bare DIE chip 1 near to the TIA, connecting to an input pad IN on the vertical axis of the bare DIE chip 1 of the TIA through a gold wire, and connecting a gold-plated pad 4 to ground through the pin GND,
stacking the resistor R11 and the filter capacitor C92 in sequence on the vertical axis between pins VDD and VAPD, wherein the resistor R11 is connected to the filter capacitor C91 through the No. 1 gold wire 5, the filter capacitor C92 is connected to the pin VAPD through the No. 2 gold wire 6; the No. 1 gold wire 5 and the No. 2 gold wire 6 form an angle of 90° to offset the electromagnetic interference leaked from the lens.

Preferably, in step A3, the process of stacking the avalanche photodiode APD 2, the filter capacitor C91 and the gold-plated pad 4 in sequence is as follows:

First, the gold-plated pad 4 is fixed to a position slightly below the center point of the built-in platform of the metal tube housing 100 with conductive silver glue, and the gold-plated pad 4 is connected to the ground through the conductive silver glue.

Second, the filter capacitor C91 is stacked and placed on the gold-plated pad 4 and fixed with conductive silver glue, one end of the filter capacitor C91 is grounded through the gold-plated pad 4.

Next, the avalanche photodiode APD 2 is stacked and placed on the filter capacitor C91, and a light receiving aperture of the avalanche photodiode APD 2 is located at the cross point of the horizontal and vertical axes of the metal tube housing 100. The cathode of the avalanche photodiode APD 2 is connected to the other end of the filter capacitor C91 and fixed with conductive silver glue.

Lastly, the anode of the avalanche photodiode APD 2 is connected to the input pad IN on the vertical axis of the bare DIE chip 1 of the TIA through a gold wire perpendicular to the horizontal axis.

Preferably, in step A3, the process of stacking the resistor R11 and the filter capacitor C92 in sequence is as follows:

First, use conductive silver glue to fix the filter capacitor C92 on the vertical axis of the storage platform, and one end of the filter capacitor C92 is grounded through the conductive silver glue;

Second, the resistor R11 is stacked and placed on the filter capacitor C92 and fixed with glue; one end of the resistor R11 is connected to the other end of the filter capacitor C92 with two gold wires;

Next, the other end of the resistor R11 is connected to the other end of the filter capacitor C91 through two No. 1 gold wires 5 perpendicular to the horizontal axis, and then connected to the cathode of the avalanche photodiode APD 2;

Lastly, the other end of the filter capacitor C92 is connected to the pin VAPD through two No. 2 gold wires 6 perpendicular to the longitudinal axis.

Preferably, it also includes a power filter capacitor 3, which is set on the horizontal axis of the storage platform between the pin OUTP and the pin VDD, and the pin VDD is connected to one end of the power filter capacitor 3 through two gold wires perpendicular to the horizontal axis;

the other end of the power filter capacitor 3 is connected to the power pad VDD on the bare DIE chip 1 of the TIA through two gold wires;

the power filter capacitor 3 is connected to the ground through conductive silver glue.

Preferably, the gold wire connection rule is: connect with the minimum span height and minimum span distance.

The second solution: the high-speed TIA anti-5G WIFI electromagnetic interference method of the present invention comprises the steps of: setting a bare DIE chip 1 of TIA and an avalanche photodiode APD 2 on a storage platform of a metal tube housing 100, wherein the metal tube housing 100 has a pin GND, a pin VAPD, a pin VDD, a pin OUTP and a pin OUTN;

The method comprises the following steps of:

B1: construct differential outputs to cancel signal interference by the following steps:
Setting the bare DIE chip 1 of the TIA on a longitudinal axis of the storage platform between the pins OUTP and OUTN;
connecting the pin OUTP to the output pad OUTP on the bare DIE chip 1 of the TIA through a No. 3 gold wire 7 perpendicular to the longitudinal axis;
connecting the pin OUTN to the output pad OUTN on the bare DIE chip 1 of the TIA through a No. 4 gold wire 8 perpendicular to the longitudinal axis;
the No. 3 gold wire 7 and the No. 4 gold wire 8 are of equal length and are kept on the same horizontal line, so as to achieve differential output of the high-speed TIA to offset each other's signal interference;

B2: Stacking steps:
the avalanche photodiode APD 2 and the gold-plated pad 4 are stacked in sequence on the longitudinal axis of the bare DIE chip 1 proximal to the TIA, and the avalanche photodiode APD 2 is connected to the input pad IN on the longitudinal axis of the bare DIE chip 1 of the TIA through a gold wire;

the gold-plated pad 4 is grounded through the pin GND, and the pin VAPD is connected to the gold-plated pad 4 through two No. 5 gold wires 9.

B3: a high-voltage capacitor C9 and a resistor R11 are built inside the current mirror chip CURRENT_MIRROR in the receiving end ROSA of the optical fiber communication module. The filter circuit formed by the high-voltage capacitor C9 and the resistor R11 is used to filter the ripple of the output pin MIROUT of the current mirror chip CURRENT_MIRROR.

Preferably, the process of step B3 is as follows:
one end of the resistor R11 is connected internally to the output terminal MIROUT of the current mirror chip CURRENT_MIRROR;
the other end of the resistor R11 is simultaneously connected to one end of the high-voltage capacitor C9 and the output pin VAPD of the current mirror chip CURRENT_MIRROR;
the other end of the high-voltage capacitor C9 is grounded;
a programmable module is provided in the current mirror chip CURRENT_MIRROR, and an output control end of the programmable module is connected to a control end of the resistor R11 and a control end of the high-voltage capacitor C9 respectively;
the signal input end of the programmable module is connected to the input pin CTL of the current mirror chip CURRENT_MIRROR.

Preferably, the process of step B2 is as follows:
First, use ordinary glue to fix the gold-plated pad 4 to the center point of the storage platform inside the metal tube housing 100.

Second, the avalanche photodiode APD 2 is stacked and placed on the gold-plated pad 4, and a light receiving aperture of the avalanche photodiode APD 2 is located at the cross point of the horizontal and vertical axes of the metal tube housing 100, and the cathode of the avalanche photodiode APD 2 is connected to the gold-plated pad 4 with conductive silver glue.

Next, the pin VAPD is connected to the gold-plated pad 4 through two No. 5 gold wires 9.

Lastly, the anode of the avalanche photodiode APD 2 is connected to the input pad IN on the bare DIE chip 1 of the TIA on the vertical axis through a gold wire perpendicular to the horizontal axis.

Preferably, it also includes a power filter capacitor 3, which is set on the horizontal axis of the storage platform between the pin OUTP and the pin VDD, and the pin VDD is connected to one end of the power filter capacitor 3 through two gold wires perpendicular to the horizontal axis;
the other end of the power filter capacitor 3 is connected to the power pad VDD on the bare DIE chip 1 of the TIA through two gold wires;
the power filter capacitor 3 is connected to the ground through conductive silver glue.

The advantageous effect of the present invention: The present invention provides a high-speed TIA anti-5G WIFI electromagnetic interference solution, which is different from the traditional anti-interference solution idea. It uses discrete or stacked high-voltage capacitors and resistors with fixed parameter values to resist WIFI interference, adopts a special wiring method and integrates the high-voltage capacitors and resistors inside the current mirror chip CURRENT_MIRROR which also needs to use a high-voltage process, and their parameter values can be adjusted or programmed to obtain the best anti-WIFI interference effect. This solution provided by the present invention not only achieves a better anti-WIFI interference effect, but also reduce the cost of use.

The first solution of the present invention uses discrete components to split the high-voltage capacitor into two high-voltage capacitors, and builds an antenna with a 90-degree angle at the two capacitors by bonding, so as to achieve the purpose of offsetting the electromagnetic interference of lens leakage. At the same time, the bare DIE output terminal OUTP and the tube housing pin OUTP, the bare DIE output terminal OUTN and the tube housing pin OUTN use the lowest crossover height and shortest distance for wire bonding. The almost identical wire bonding can make the differential output of the high-speed TIA offset the signal interference. This method does not eliminate the existence of the antenna, but uses special means to make the antennas cancel each other's signal interference.

The second solution of the present invention further optimizes the first solution by integrating high-voltage capacitors and resistors into a current mirror chip manufactured by a high-voltage process, thereby reducing the overall cost of the module and allowing for a variety of filter configurations to optimize anti-interference performance.

DETAILED DESCRIPTION OF THE PREFERRED EMBODIMENT

The following will clearly and completely describe the technical solutions in the embodiments of the present invention with reference to the accompanying drawings in the embodiments of the present invention. Clearly, the described embodiments are only some, not all, of the embodiments of the present invention. Based on the embodiments of the present invention, all other embodiments obtained by persons of ordinary skill in the art without creative efforts or inventive steps fall within the protection scope of the present invention.

It should be noted that as long as there is no conflict, the different embodiments or the different features in different embodiments can be combined with each other.

The present invention is further described in conjunction with accompanying drawings and specific embodiment as follows, which is not intended to be limiting.

Preferred Embodiment 1: This embodiment is described below with reference to FIG. 4 and FIG. 5. According to this embodiment, a high-speed TIA anti-5G WIFI electromagnetic interference method includes the followings: a bare DIE chip 1 of TIA and an avalanche photodiode APD 2 is arranged on a storage platform of a metal tube housing 100, and the metal tube housing 100 has a pin GND, a pin VAPD, a pin VDD, a pin OUTP and a pin OUTN.

The method is to stack a high-voltage capacitor C9 and a resistor R11 to construct a filter circuit on top of the bare DIE chip of the TIA, the filter circuit is used to filter the ripple of an output pin MIROUT of a current mirror chip CURRENT_MIRROR inside a receiving end ROSA of an optical fiber communication module. According to this embodiment, the gold wire connection rule during the wire bonding process is: connect with the lowest span height and the minimum span distance.

The wire bonding process specifically includes the following steps:

A1: split the high-voltage capacitor C9 into two parallel filter capacitors C91 and C92, and satisfy C9=C91+C92, C91=C92.

Figure 1:
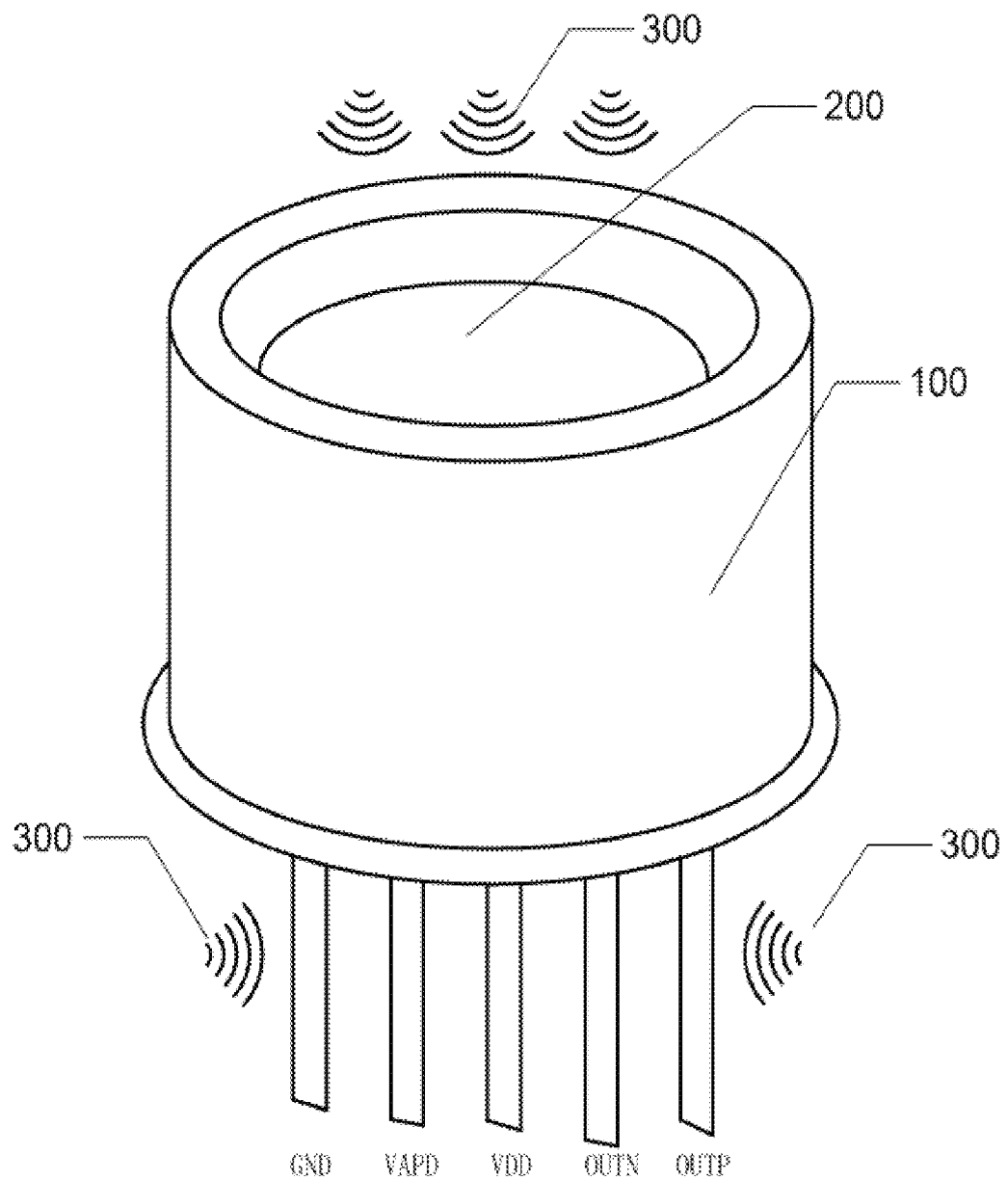
FIG. 1 is a schematic diagram of electromagnetic interference on TO package.
Figure 2:
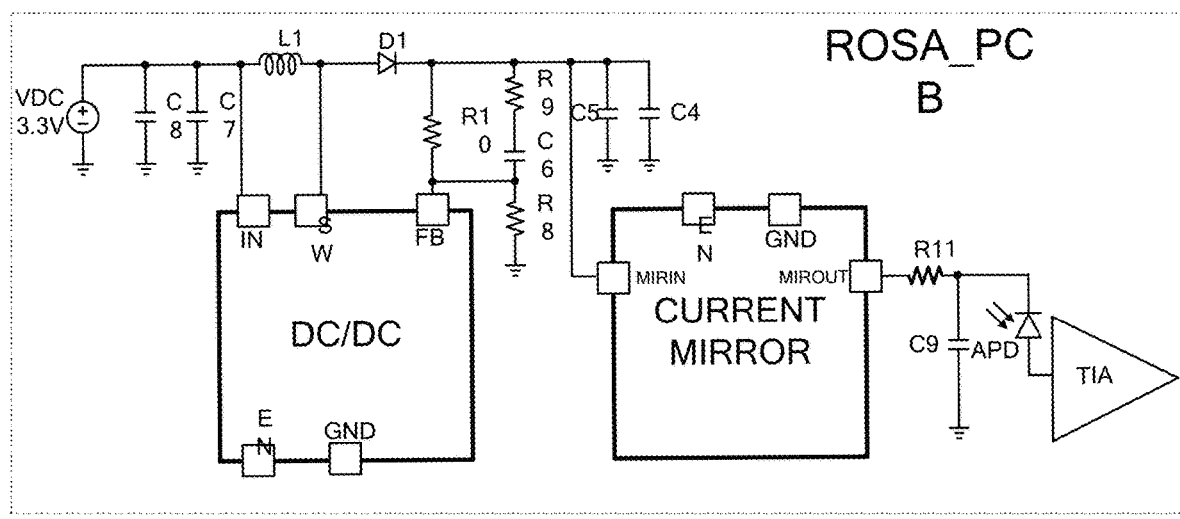
FIG. 2 is a traditional anti-WiFi interference ROSA_PCB circuit diagram.
Figure 3:
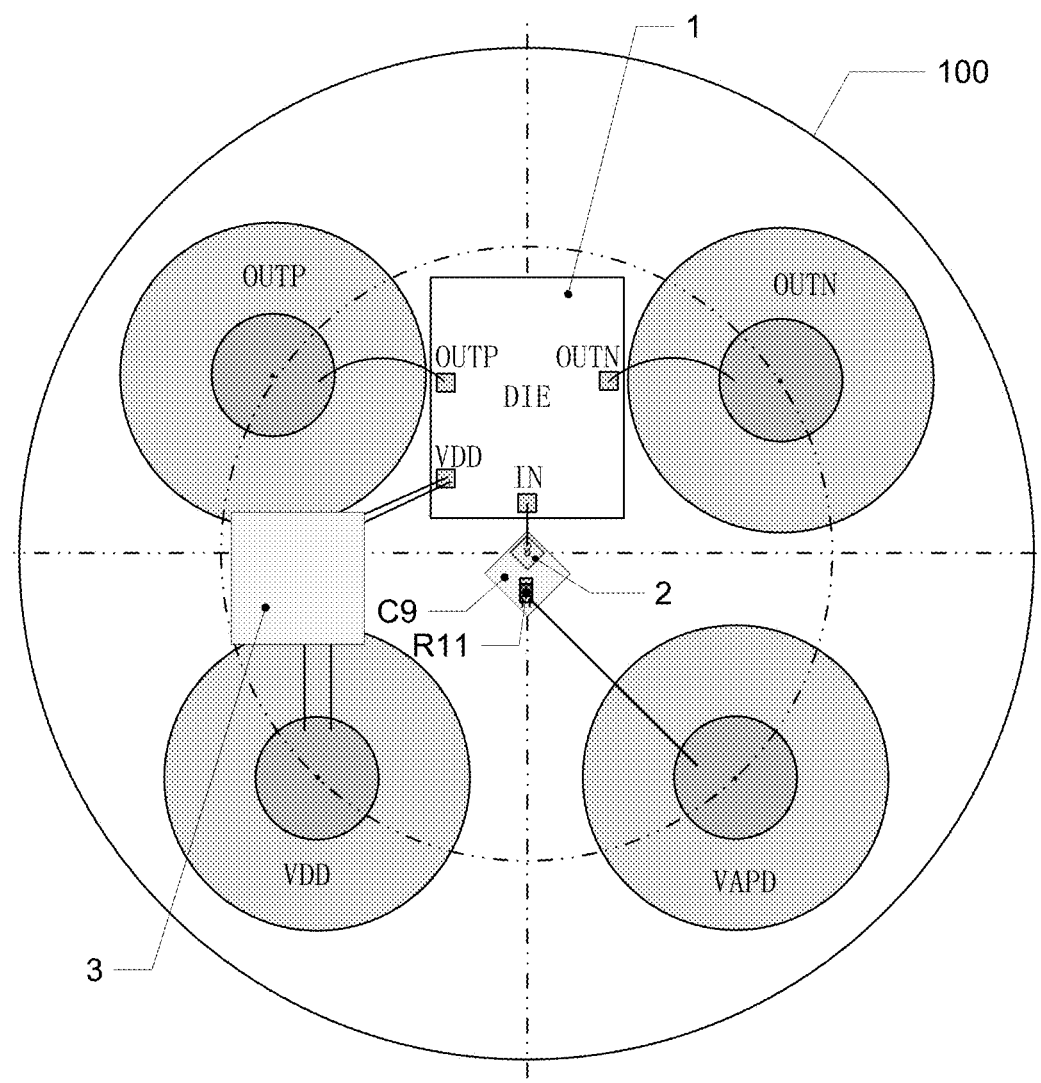
FIG. 3 is a schematic diagram of traditional anti-WiFi interference TO wire bonding scheme.
Figure 4:
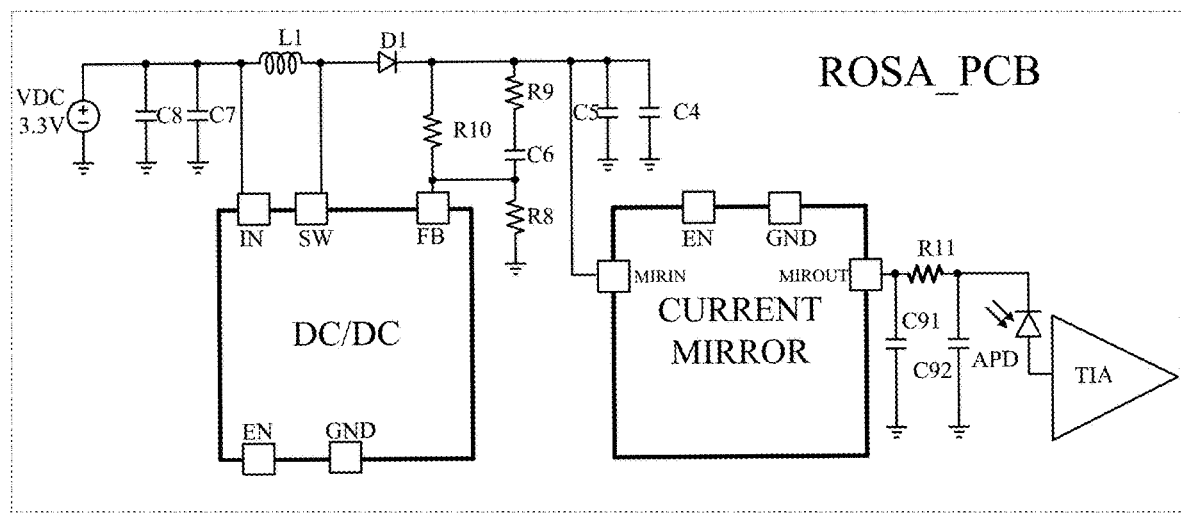
FIG. 4 is an anti-WiFi interference ROSA_PCB circuit diagram according to embodiment 1 of the present invention.
Figure 5:
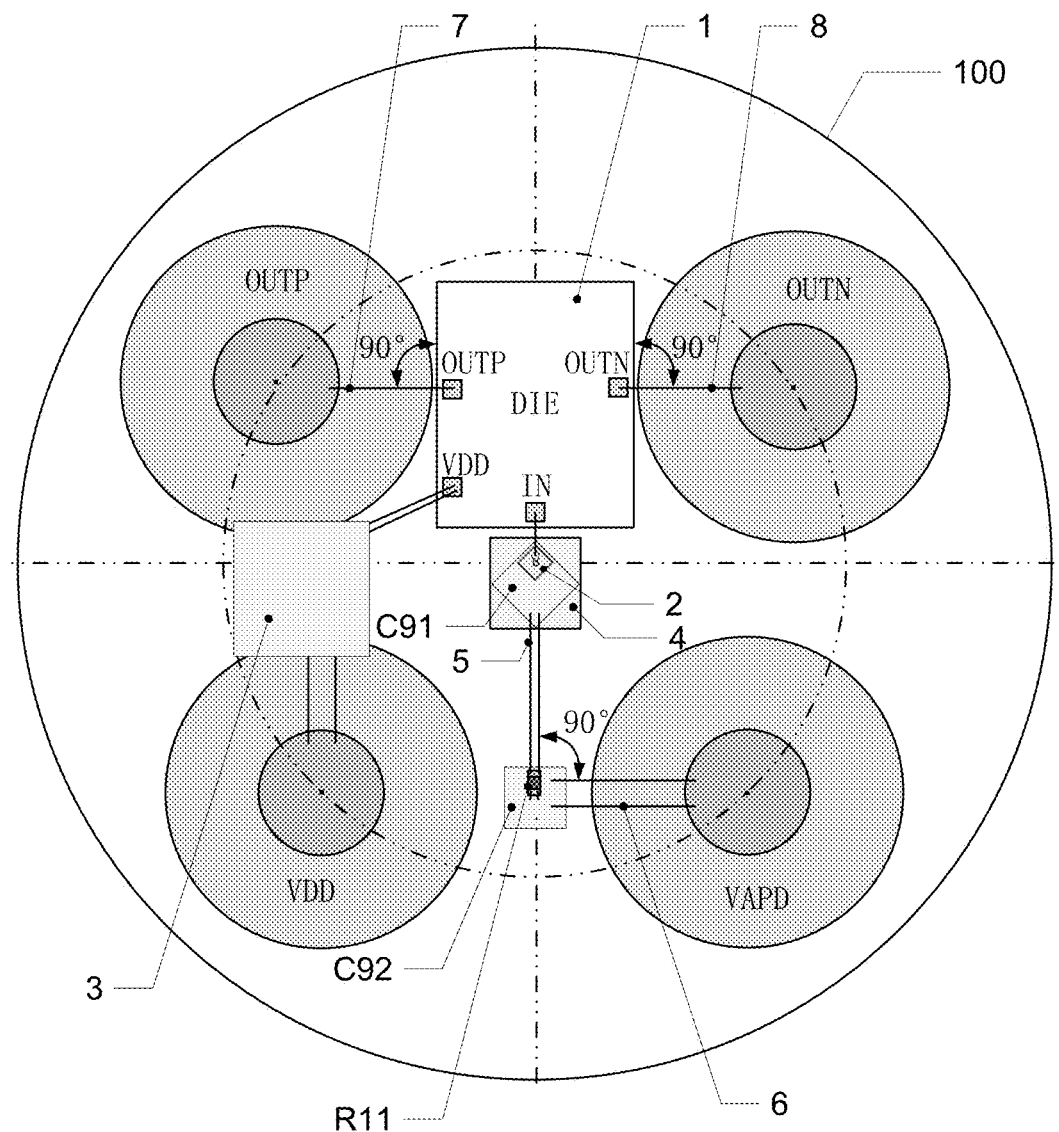
FIG. 5 is a schematic diagram of anti-WiFi interference TO wire bonding scheme according to a first preferred embodiment of the present invention.

Referring to FIG. 4 of the drawings, except for splitting the high-voltage capacitor C9, the other circuit structures are consistent with the conventional circuit structure of FIG. 2

Since the chip area of existing TIA is generally relatively small, which is about 1 mm$^2$, only relatively small high-voltage capacitor can be manufactured on this chip area. The splitting the high-voltage capacitor in this step is to reduce the size of the capacitor and make it possible to stack it with a relatively small bare DIE chip.

Taking the high-voltage capacitor C9=940 pF as an example, it is split into two 470 pF capacitors C91 and C92, and together with a 200-ohm resistance R11 are used for filter processing to filter out the ripple of the output pin of the current mirror chip CURRENT_MIRROR. This step splits the high-voltage capacitor into two 470 pF capacitors, which reduces the larger parasitic inductance caused by the upper plate of the large capacitor compared to using a single 940 pF capacitor, and avoids harmonic oscillation.

A2: the step of constructing differential outputs to cancel signal interference:

Setting the bare DIE chip 1 of the TIA on a longitudinal axis of the storage platform between the pins OUTP and OUTN;

connecting the pin OUTP to the output pad OUTP on the bare DIE chip 1 of the TIA through a No. 3 gold wire 7 perpendicular to the longitudinal axis;

connecting the pin OUTN to the output pad OUTN on the bare DIE chip 1 of the TIA through a No. 4 gold wire 8 perpendicular to the longitudinal axis;

the No. 3 gold wire 7 and the No. 4 gold wire 8 are of equal length and are kept on the same horizontal level, so as to achieve mutual cancellation of signal interference of differential outputs of the high-speed TIA.

In this step, both the No. 3 gold wire 7 and the No. 4 gold wire 8 are wired with the minimum span height (when connecting between stacked components) and the minimum span distance (when connecting between components on the same layer); and the symmetrical and almost identical wire bonding of the No. 3 gold wire 7 and the No. 4 gold wire 8 can make the differential output of the high-speed TIA cancel each other's signal interference.

A3: the step of constructing an electromagnetic interference that cancels out lens leakage:

the avalanche photodiode APD 2, the filter capacitor C91 and a gold-plated pad 4 are stacked in sequence on a vertical axis of the bare DIE chip 1 near to the TIA, and are connect to an input pad IN on the vertical axis of the bare DIE chip 1 of the TIA through a gold wire, and connecting a gold-plated pad 4 to ground through the pin GND, the resistor R11 and the filter capacitor C92 are stacked in sequence on the vertical axis between pins VDD and VAPD, the resistor R11 is connected to the filter capacitor C91 through the No. 1 gold wire 5, the filter capacitor C92 is connected to the pin VAPD through the No. 2 gold wire 6;

the No. 1 gold wire 5 and the No. 2 gold wire 6 form an angle of 90° to offset the electromagnetic interference leaked from the lens.

In this step, the key to this solution's ability to resist electromagnetic waves leaking from the lens lies in the special wire bonding method: Both the No. 1 gold wire 5 and the No. 2 gold wire 6 are bonded with double gold wires. The parasitic resistance and inductance of the two wires in parallel are smaller, and the anti-interference effect is better. Both the No. 1 gold wire 5 and the No. 2 gold wire 6 are wired with the minimum span height (when connecting between stacked components) and the minimum span distance (when connecting between components on the same layer). The purpose of this is to shorten the antenna formed by the metal wire. The first gold wire 5 and the second gold wire 6 are perpendicular to each other to form a 90° angle, which is used to offset the electromagnetic interference leaked by the lens.

In step A3, the process of stacking the avalanche photodiode APD 2, the filter capacitor C91 and the gold-plated pad 4 in sequence is as follows:

First, the gold-plated pad 4 is fixed to a position slightly below the center point of the built-in platform of the metal tube housing 100 with conductive silver glue, and the gold-plated pad 4 is connected to the ground through the conductive silver glue.

Second, the filter capacitor C91 is stacked and placed on the gold-plated pad 4 and fixed with conductive silver glue, one end of the filter capacitor C91 is grounded through the gold-plated pad 4.

Below the filter capacitor C91 (470 pF) is the gold-plated pad 4, which is used to project the electromagnetic waves leaked from the lens and discharge the interference signal absorbed by the filter capacitor C91 to the ground of the metal housing more quickly.

Next, the avalanche photodiode APD 2 is stacked and placed on the filter capacitor C91, and a light receiving aperture of the avalanche photodiode APD 2 is located at the cross point of the horizontal and vertical axes of the metal tube housing 100. The cathode of the avalanche photodiode APD 2 is connected to the other end of the filter capacitor C91 and fixed with conductive silver glue.

Lastly, the anode of the avalanche photodiode APD 2 is connected to the input pad IN on the vertical axis of the bare DIE chip 1 of the TIA through a gold wire perpendicular to the horizontal axis.

In step A3, the process of stacking the resistor R11 and the filter capacitor C92 in sequence is as follows:

first, use conductive silver glue to fix the filter capacitor C92 on the vertical axis of the storage platform, and one end of the filter capacitor C92 is grounded through the conductive silver glue;

second, the resistor R11 is stacked and placed on the filter capacitor C92 and fixed with glue; one end of the resistor R11 is connected to the other end of the filter capacitor C92 with two gold wires;

next, the other end of the resistor R11 is connected to the other end of the filter capacitor C91 through two No. 1 gold wires 5 perpendicular to the horizontal axis, and then connected to the cathode of the avalanche photodiode APD 2;

lastly, the other end of the filter capacitor C92 is connected to the pin VAPD through two No. 2 gold wires 6 perpendicular to the longitudinal axis.

Furthermore, it also includes a power filter capacitor 3, which is set on the horizontal axis of the storage platform between the pin OUTP and the pin VDD, and the pin VDD is connected to one end of the power filter capacitor 3 through two gold wires perpendicular to the horizontal axis;

the other end of the power filter capacitor 3 is connected to the power pad VDD on the bare DIE chip 1 of the TIA through two gold wires with minimum span height and minimum span distance;

the power filter capacitor 3 is connected to the ground through conductive silver glue.

The power filter capacitor 3 uses a 1 nF filter capacitor. This is the capacitor connection method of the power supply part, which is not highly related to the anti-interference solution of this embodiment.

Figure 6:
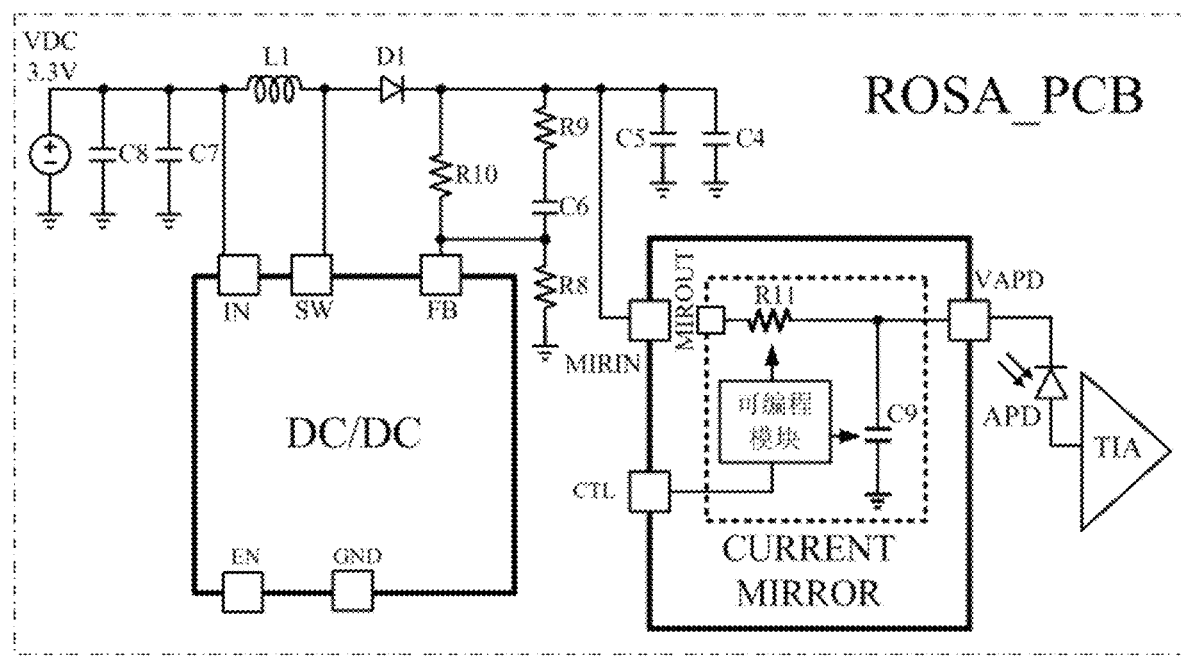
FIG. 6 is an anti-WiFi interference ROSA_PCB circuit diagram according to a second preferred embodiment of the present invention.
Figure 7:
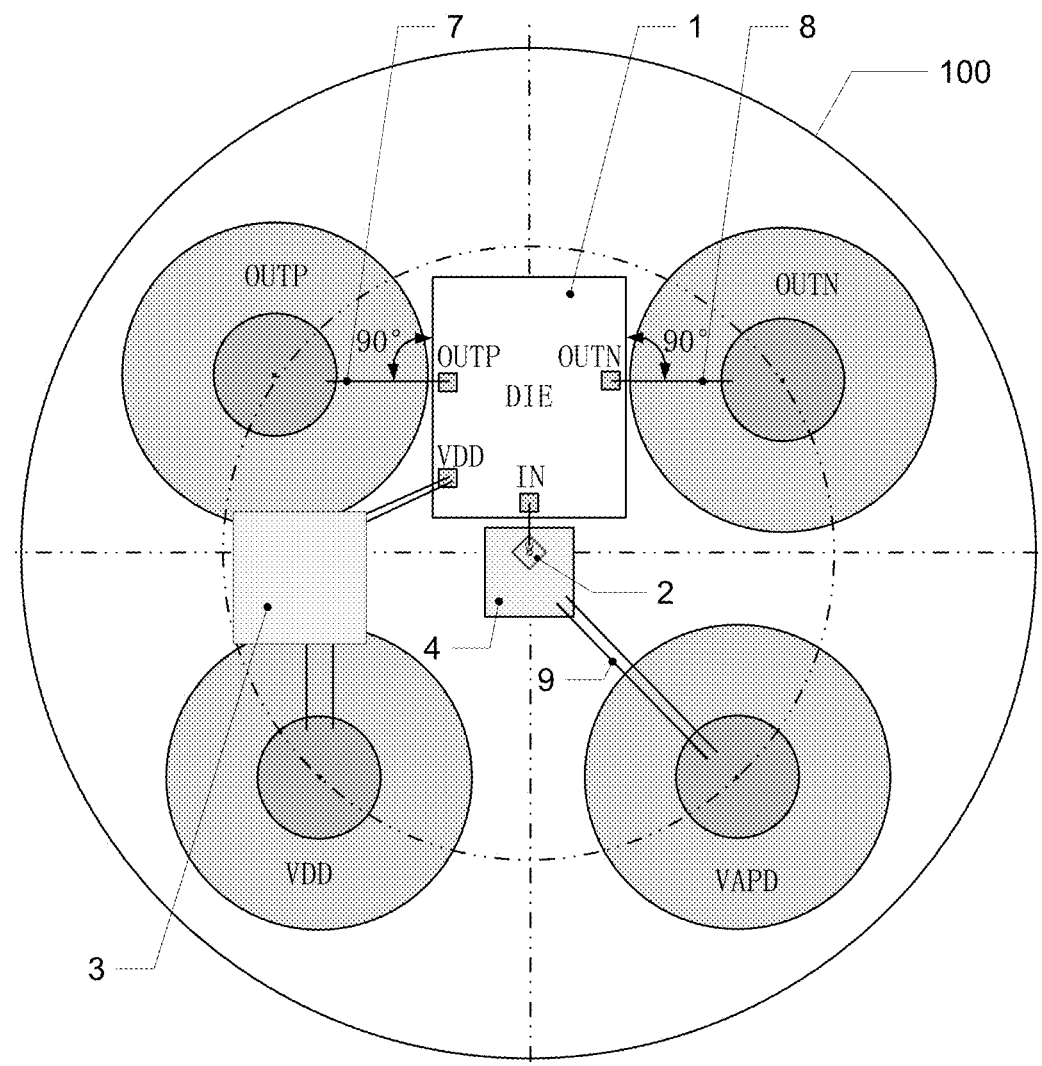
FIG. 7 is a schematic diagram of anti-WiFi interference TO wire bonding scheme according to a second preferred embodiment of the present invention.

Preferred Embodiment 2: This embodiment is described below with reference to FIG. 6 and FIG. 7. According to this embodiment, a high-speed TIA anti-5G WIFI electromagnetic interference method includes the followings: a bare DIE chip 1 of TIA and an avalanche photodiode APD 2 is arranged on a storage platform of a metal tube housing 100, and the metal tube housing 100 has a pin GND, a pin VAPD, a pin VDD, a pin OUTP and a pin OUTN.

According to this embodiment, the gold wire connection rule during the wire bonding process is: connect with the minimum span height and the minimum span distance.

In view of the fact that the preferred embodiment 1 uses discrete components: high-voltage capacitors and resistors, there is still room for optimization in terms of cost and space. Therefore, this embodiment provides an optimization solution. Ordinary current mirror chips withstand voltages of tens of V and are not suitable for integrating high-voltage capacitors. High-voltage capacitors require a withstand voltage of at least 100V.

Therefore, the inside of the current mirror chip CURRENT_MIRROR of this embodiment uses a high-voltage process, which enables the current mirror chip CURRENT_MIRROR to integrate high-voltage capacitors. Also, the bare DIE area of the current mirror chip SAMPLE HOLD is about 2~4 mm$^2$, and the size also has the conditions for integrating high-voltage capacitors with larger area and capacitance. Therefore, the high-voltage capacitors and resistors that were originally discretely set inside the tube shell are transferred to the current mirror chip, and the capacitance of the high-voltage capacitor and the size of the resistor are adjusted by trimming and programming through the programmable module to achieve the best anti-interference effect (different combinations of capacitance and resistance have different signal cutoff frequencies and different filtering effects). This setting method reduces the overall cost of the module, and can also configure filters in a variety of ways to optimize anti-interference performance.

The method comprises the following steps:

B1: the step of constructing differential outputs to cancel signal interference:

the bare DIE chip 1 of the TIA is arranged on a longitudinal axis of the storage platform between the pins OUTP and OU TN;

the pin OUTP is connected to the output pad OUTP on the bare DIE chip 1 of the TIA through a No. 3 gold wire 7 perpendicular to the longitudinal axis;

the pin OUTN is connected to the output pad OUTN on the bare DIE chip 1 of the TIA through a No. 4 gold wire 8 perpendicular to the longitudinal axis;

the No. 3 gold wire 7 and the No. 4 gold wire 8 are of equal length and are kept on the same horizontal level, so as to achieve mutual cancellation of signal interference of differential outputs of the high-speed TIA.

In this step, Both the No. 3 gold wire 7 and No. 4 gold wire 8 are wired with the minimum span height (when connecting between stacked components) and the minimum span distance (when connecting between components on the same layer), and the symmetrical and almost identical wire bonding of the No. 3 gold wire 7 and the No. 4 gold wire 8 can make the differential output of the high-speed TIA cancel each other's signal interference.

B2: the step of stacking:

the avalanche photodiode APD 2 and the gold-plated pad 4 are stacked in sequence on the longitudinal axis of the bare DIE chip 1 proximal to the TIA, and the avalanche photodiode APD 2 is connected to the input pad IN on the longitudinal axis of the bare DIE chip 1 of the TIA through a gold wire;

the gold-plated pad 4 is grounded through the pin GND, and the pin VAPD is connected to the gold-plated pad 4 through two No. 5 gold wires 9.

The process of step B2 is:

First, use ordinary glue to fix the gold-plated pad 4 to the center point of the storage platform inside the metal tube housing 100.

Second, the avalanche photodiode APD 2 is stacked and placed on the gold-plated pad 4, and the light receiving aperture of the avalanche photodiode APD 2 is located at the cross point of the horizontal and vertical axes of the metal tube housing 100, and the cathode of the avalanche photodiode APD 2 is connected to the gold-plated pad 4 by conductive silver glue.

Next, the pin VAPD is connected to the gold-plated pad 4 through two No. 5 gold wires 9.

Lastly, the anode of the avalanche photodiode APD 2 is connected to the input pad IN on the bare DIE chip 1 of the TIA on the vertical axis through a gold wire perpendicular to the horizontal axis.

In this process, the side of the gold-plated pad 4 close to the tube housing is fixed with non-conductive ordinary glue and the gold-plated pad 4 with a relatively large area reflects the electromagnetic interference signal. The No. 5 gold wire 9 uses a double-wire method and connects the pin VAPD of the tube housing to the gold-plated pad 4 with the minimum span height and minimum span distance.

B3: a high-voltage capacitor C9 and a resistor R11 are built inside the current mirror chip CURRENT_MIRROR in the receiving end ROSA of the optical fiber communication module. The filter circuit formed by the high-voltage capacitor C9 and the resistor R11 is used to filter the ripple of the output pin MIROUT of the current mirror chip CURRENT_MIRROR.

The process of step B3 is:

one end of the resistor R11 is connected internally to the output terminal MIROUT of the current mirror chip CURRENT_MIRROR;

the other end of the resistor R11 is simultaneously connected to one end of the high-voltage capacitor C9 and the output pin VAPD of the current mirror chip CURRENT_MIRROR;

the other end of the high-voltage capacitor C9 is grounded;

a programmable module is provided in the current mirror chip CURRENT_MIRROR, and an output control end of the programmable module is connected to a control end of the resistor R11 and a control end of the high-voltage capacitor C9 respectively;

the signal input end of the programmable module is connected to the input pin CTL of the current mirror chip CURRENT_MIRROR.

Furthermore, it also includes a power filter capacitor 3, which is set on the horizontal axis of the storage platform between the pin OUTP and the pin VDD, and the pin VDD is connected to one end of the power filter capacitor 3 through two gold wires perpendicular to the horizontal axis;

the other end of the power filter capacitor 3 is connected to the power pad VDD on the bare DIE chip 1 of the TIA through two gold wires;

the power filter capacitor 3 is connected to the ground through conductive silver glue.

The power filter capacitor 3 uses a 1 nF filter capacitor. The 1 nF filter capacitor is interconnected with the gold wires between the power pads VDD of TIA's bare DIE chip, and the minimum span height and minimum span distance are also used for wiring. This is the capacitor connection method of the power supply part, which is not highly related to the anti-interference solution of the method in this embodiment.

Although the present invention is described herein with reference to specific embodiments, it should be understood that these embodiments are merely illustrative of the principles and applications of the present invention. It is therefore to be understood that numerous modifications may be made to the exemplary embodiments and that other arrangements may be devised without departing from the spirit and scope of the present invention as defined by the appended claims. It shall be understood that different dependent claims and features described herein may be combined in a different way than that described in the original claims. It should also be appreciated that features described in connection with individual embodiments can be used in other described embodiments.

What is claimed is:

1. A high-speed TIA anti-5G WIFI electromagnetic interference method, comprising:
    providing a bare DIE chip (1) of a TIA and an avalanche photodiode APD (2) on a storage platform of a metal tube housing (100), wherein the metal tube housing (100) has a pin GND, a pin VAPD, a pin VDD, a pin OUTP and a pin OUTN;
    characterized in that, the method is to stack a high-voltage capacitor C9 and a resistor R11 for constructing a filter circuit on the bare DIE chip of the TIA, wherein the filter circuit filters the ripple of an output pin MIROUT of a current mirror chip CURRENT_MIRROR inside a receiving end ROSA of an optical fiber communication module, and specifically comprises the following steps:
    A1: splitting the high-voltage capacitor C9 into two parallel filter capacitors C91 and C92, and satisfy C9=C91+C92, C91=C92;
    A2: constructing differential outputs to cancel signal interference by the following steps:
    arranging the bare DIE chip (1) of the TIA on a longitudinal axis of the storage platform between the pins OUTP and OUTN;
    connecting the pin OUTP to the output pad OUTP on the bare DIE chip (1) of the TIA through a No. 3 gold wire (7) perpendicular to the longitudinal axis;
    connecting the pin OUTN to the output pad OUTN on the bare DIE chip (1) of the TIA through a No. 4 gold wire (8) perpendicular to the longitudinal axis;
    the No. 3 gold wire (7) and the No. 4 gold wire (8) are of equal length and are kept on the same horizontal level, so as to achieve mutual cancellation of signal interference of differential outputs of the high-speed TIA;
    A3: cancel out electromagnetic interference from lens leakage by the following steps:
    stacking the avalanche photodiode APD (2), the filter capacitor C91 and a gold-plated pad (4) in sequence on a vertical axis of the bare DIE chip (1) proximal to the TIA, connecting to an input pad IN on the vertical axis of the bare DIE chip (1) of the TIA through a gold wire, and connecting a gold-plated pad (4) to ground through the pin GND;
    stacking the resistor R11 and the filter capacitor C92 in sequence on the vertical axis between pins VDD and VAPD, wherein the resistor R11 is connected to the filter capacitor C91 through the No. 1 gold wire (5), the filter capacitor C92 is connected to the pin VAPD through the No. 2 gold wire (6);
    the No. 1 gold wire (5) and the No. 2 gold wire (6) form an included angle of 90° to offset the electromagnetic interference leaked from the lens.

2. The high-speed TIA anti-5G WIFI electromagnetic interference method according to claim 1, characterized in that, in step A3, the process of stacking the avalanche photodiode APD (2), the filter capacitor C91 and the gold-plated pad (4) in sequence is that:
    first, the gold-plated pad (4) is fixed to a position slightly below the center point of the storage platform inside the metal tube housing (100) with conductive silver glue, and the gold-plated pad (4) is connected to the ground through the conductive silver glue;
    second, the filter capacitor C91 is stacked and placed on the gold-plated pad (4) and fixed with conductive silver glue, one end of the filter capacitor C91 is grounded through the gold-plated pad (4);
    next, the avalanche photodiode APD (2) is stacked and placed on the filter capacitor C91, and a light receiving aperture of the avalanche photodiode APD (2) is located at a cross point of the horizontal and vertical axes of the metal tube housing (100), the cathode of the avalanche photodiode APD (2) is connected to the other end of the filter capacitor C91 and fixed with conductive silver glue;
    lastly, the anode of the avalanche photodiode APD (2) is connected to the input pad IN on the vertical axis of the bare DIE chip (1) of the TIA through a gold wire perpendicular to the horizontal axis.

3. The high-speed TIA anti-5G WIFI electromagnetic interference method according to claim 2, characterized in that, the gold wire connection rule is: connect with the minimum span height and minimum span distance.

4. The high-speed TIA anti-5G WIFI electromagnetic interference method according to claim 1, characterized in that, in step A3, the process of stacking the resistor R11 and the filter capacitor C92 in sequence is that:
    first, use conductive silver glue to fix the filter capacitor C92 on the vertical axis of the storage platform, and one end of the filter capacitor C92 is grounded through the conductive silver glue;
    second, the resistor R11 is stacked and placed on the filter capacitor C92 and fixed with glue; one end of the resistor R11 is connected to the other end of the filter capacitor C92 with two gold wires;

next, the other end of the resistor R11 is connected to the another end of the filter capacitor C91 through two No. 1 gold wires (5) perpendicular to the horizontal axis to achieve connection to the cathode of the avalanche photodiode APD (2);

lastly, the another end of the filter capacitor C92 is connected to the pin VAPD through two No. 2 gold wires (6) perpendicular to the longitudinal axis.

5. The high-speed TIA anti-5G WIFI electromagnetic interference method according to claim 4, characterized in that, the gold wire connection rule is: connect with the minimum span height and minimum span distance.

6. The high-speed TIA anti-5G WIFI electromagnetic interference method according to claim 1, characterized in that, further comprising a power filter capacitor 3, the power filter capacitor (3) is arranged on the horizontal axis of the storage platform between the pin OUTP and the pin VDD, and the pin VDD is connected to one end of the power filter capacitor (3) through two gold wires perpendicular to the horizontal axis;

the another end of the power filter capacitor (3) is connected to the power pad VDD on the bare DIE chip (1) of the TIA through two gold wires;

the power filter capacitor (3) is connected to the ground through conductive silver glue.

7. The high-speed TIA anti-5G WIFI electromagnetic interference method according to claim 6, characterized in that, the gold wire connection rule is: connect with the minimum span height and minimum span distance.

8. The high-speed TIA anti-5G WIFI electromagnetic interference method according to claim 1, characterized in that, the gold wire connection rule is: connect with the minimum span height and minimum span distance.

* * * * *